UNITED STATES PATENT OFFICE.

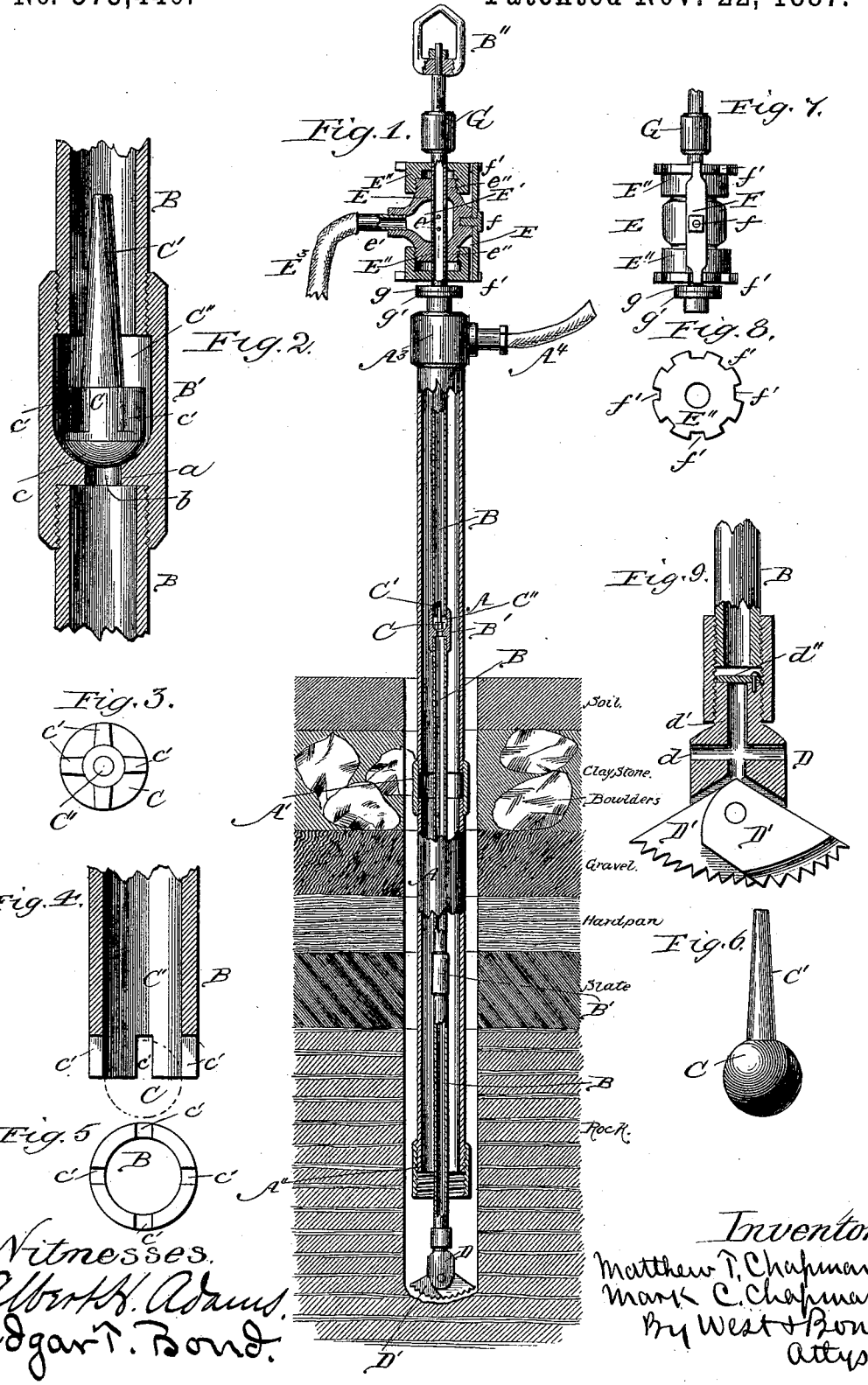

MATTHEW T. CHAPMAN AND MARK C. CHAPMAN, OF AURORA, ILLINOIS.

APPARATUS FOR SINKING WELLS.

SPECIFICATION forming part of Letters Patent No. 373,440, dated November 22, 1887.

Application filed October 30, 1885. Serial No. 181,392. (No model.)

*To all whom it may concern:*

Be it known that we, MATTHEW T. CHAPMAN and MARK C. CHAPMAN, residing at Aurora, in the county of Kane and State of Illinois, and citizens of the United States, have invented a new and useful Improvement in Apparatus for Sinking Wells, of which the following is a full description, reference being had to the accompanying drawings, in which—

Figure 1 is an elevation, partly in section, showing the devices in use; Fig. 2, an enlarged detail of the lifting-valve and its chamber; Fig. 3, a top view of the lifting-valve; Figs. 4 and 5, modifications, showing the openings in the end of the tube instead of the valve; Fig. 6, a detail showing the form of valve to be used with the modification of Fig. 4; Fig. 7, a detail, being a side elevation of the discharge-chamber; Fig. 8, a detail, being a top view of one of the stuffing-boxes of the chamber; Fig. 9, a detail, partly in section, showing one form of drill.

This invention relates to devices for sinking wells, in which a casing is carried down a hole formed by a drilling-tool carried by a hollow drill-rod, in which rod is located a series of valves, which act to lift the water and other waste material as the rod is raised and dropped, such water and waste material being carried away at the surface of the ground, and has for its objects to improve the construction and operation of the lifting-valves, to improve the discharge-chamber at the surface of the ground by locking the stuffing-boxes, and thereby prevent the turning of the drill-rod from unloosening the boxes, and to prevent the concussion of the drill-rod in dropping from producing injurious effects on the rod, the discharge-chamber, and the connections of the rod and discharge-chamber; and it consists in the novel construction and combination of parts, hereinafter fully described, and specifically pointed out in the claims.

In the drawings, A represents the casing or tube which is to be sunk, made up of sections secured one to the other by suitable couplings, A', the lower section having at its bottom end a coupling, A'', for the attachment of a screen or other device, if desired, and, as shown, the upper section at the top end is provided with a T-coupling, A³, to which is attached a hose or pipe, A⁴, for supplying water to the hole.

B is the drill-rod, formed of sections of hollow tubing secured together by couplings B', the upper section receiving a swivel or eye, B'', for the attachment of the rope by which the rod is raised.

C is a valve, one for each coupling B', and located in a chamber, C'', formed in the coupling, each coupling having a diaphragm or cross-wall, a, with a hole, b, which wall furnishes the seat for the valve C, and, as shown, the seat end c of the valve C is rounded off, but can be beveled or otherwise formed, and the periphery of the valve is provided with a series of openings, c'. Each valve is provided with a stem or extension, C', which, as shown, is of a length sufficient to extend beyond the coupling B' into the next pipe or tube section of the drill-rod.

D is a drill-head attached to the lower section of the drill-rod, and carrying drill-blades D', which blades, as shown, are expansible, and have their acting edges serrated or provided with teeth. The drill-head D is provided with an opening, d, leading from the exterior to the interior of the drill-rod for the admission of water and the waste material to the rod, the opening d leading into a vertical opening, d', in the drill-head, which is opened and closed by a flap valve, d'', as shown, to control the inflow to the interior of the drill-rod.

E is a casing or shell having an interior opening, E', which has communication with the drill-rod through holes e in such rod. This casing or shell E is located around the drill-rod, and is held in position by stuffing-boxes E'' at the top and bottom, the stuffing-boxes screwing onto screw-threaded bosses e'' at the ends of the chamber, and this chamber at one side is provided with a screw-threaded boss, e', for the attachment of a hose or other pipe, E³, to lead away the water and other material.

F is a spring-catch attached to the shell or casing E on one side by a screw, f, or otherwise, and arranged to have its ends engage with notches f', formed in a flange on each stuffing-box, by which means the stuffing-boxes are held against turning off or on by the turning of the drill-rod.

G is a head for attaching the swivel B″ to the drill-rod. This head is located on the drill-rod above the upper end of the chamber E, and below the chamber E and in contact therewith is a bumper, $g$, of rubber or other yielding material, encircling the drill-rod, below which is a metal washer, $g'$, also encircling the drill-rod, which devices form a cushion to take the concussion as the drill-rod drops and the chamber E comes in contact with the head or coupling $A^3$ on the upper end of the casing A, and thus prevent the effects of the blow being carried to the chamber E and the drill-rod.

As shown in Figs. 4, 5, and 6, the valve C is in the form of a round ball without peripheral openings, and the openings $c'$ for the passage of the water and other material, when the valve is against the end of the preceding pipe-section, are formed in the lower end of such preceding pipe-section.

In operation, as the drill-rod is dropped, through suitable hoisting and dropping devices, (not shown), the force of the blow as the drill strikes the ground throws up the valve $d''$ in the drill-head, allowing the water to pass into the lower section of the drill-rod, and as such section becomes filled the force of the blow raises the lifting-valve C in the preceding coupling, allowing the water to pass into the preceding section of the drill-rod, and so on until the sections are successively filled, when the water and other material pass through the holes $e$ around the upper section of the drill-rod into the chamber E′, from which it passes out through the boss $e'$ and discharge hose or pipe $E^3$. The valves all drop into position to close the openings in their respective couplings with each ascent of the rod, so that the water and other material caught in each section of the drill-rod will be held therein until the accumulation reaches and passes out into the chamber E′, and as the valve is thrown up in each coupling the passage of the water into the preceding section of the tube-rod is not shut off, as such water and waste material can pass through the apertures or holes $c'$ up into the preceding tube-section, thus preventing the stoppage of the flow of the water by the engagement of the valve with the end of the preceding tube-section. The tubing, in case it becomes filled and packed with dirt, so that it will not operate properly, is lifted and each section in succession unscrewed, detached, and cleaned, and by providing the stems C′ for the valves C it will be seen that these valves can readily be removed, as the end of the stem projects above the end of its coupling sufficient to be grasped by the hand, and this removal of the valve clears the chamber C″ of the accumulation therein, and also allows the waste in the next section to unload by the admission of air.

The turning of the drill-rod after the drill has descended to cause the blades to perform their work cannot affect the chamber or casing E and its stuffing-boxes, as such parts are rigidly held in place by the catch F, and to remove the chamber for repairs or cleaning purposes the catch F is detached, when the stuffing-boxes can be removed and the necessary cleaning or repairing done.

What we claim as new, and desire to secure by Letters Patent, is—

1. The combination, with a tubular drill-rod formed in sections and chambered couplings connecting said sections, of a valve located in each coupling and having peripheral passages and an elongated valve-stem projecting beyond the coupling into the next upper rod-section, substantially as described.

2. The combination, with a tube or drill-rod, of a receiving-chamber located around such tube or rod, and the spring-catch F, engaging the stuffing-boxes of the chamber and holding such boxes in place against the turning of the tube or rod, substantially as specified.

3. The combination, with a main casing or tube, of a discharge-chamber and a bumper or cushion located around a tube or drill-rod for preventing injurious effects from the dropping of the tube or rod, substantially as specified.

MATTHEW T. CHAPMAN.
MARK C. CHAPMAN.

Witnesses:
FRED. J. LUKINS,
JOHN HORNE.